June 24, 1958          A. PAUL          2,840,421

WHEEL STRUCTURE AND BEARING MEMBER FOR USE IN SAME

Filed March 31, 1955

INVENTOR.
ALEX PAUL
BY
Ooms, McDougall, Williams
& Hersh   Attorneys

United States Patent Office 2,840,421
Patented June 24, 1958

2,840,421

WHEEL STRUCTURE AND BEARING MEMBER FOR USE IN SAME

Alex Paul, Elmwood Park, Ill., assignor to Radio Steel & Mfg. Co., Chicago, Ill., a corporation of Illinois Application March 31, 1955, Serial No. 498,149

1 Claim. (Cl. 301—63)

This invention relates to an improved wheel assembly for toy wheel structures, and relates more particularly to a bearing assembly in a wheel for coaster wagons, scooters, and other similar wheeled vehicles.

To the present, wheel assemblies formed of a pair of interconnected disc members having registered openings at the center for receiving bearing members inserted to the end portion thereof for rotatably mounting the wheels on an axle or other supporting shafts have been formed with a tubular sleeve which extends continuously through the aligned openings between the disc members to provide a cylinder in which the bearing elements are received. The bearing members are intended to be retained in their assembled relation within the sleeve in response to frictional engagement between the outer surfaces of the bearing and the inner surfaces of the sleeve when in the assembled relation.

Such tubular members as have heretofore been employed represent a substantial proportion of the cost of the wheel assembly. However, when such tubular members have been replaced by a sleeve which may be rolled out of strip material, as from sheet metal scrap or the like, it has been found that such split sleeves are capable of expansions and contractions differing in relation from the expansions and contractions which take place in the bearing. As a result, the bearing members become loosened within the sleeves and may inadvertently fall off of the wheel.

It is an object of this invention to produce a new and improved wheel structure wherein use can be made of such low-cost split sleeve sections for support of bearing members within the wheel sub, and it is a related object to produce a bearing assembly for use in the same.

More specifically, it is an object of this invention to produce a wheel assembly of the type described which is formed with a split sleeve for receiving the bearing members and which embodies means within the structure for preventing loss in the dimensional relationship between the bearing member and the sleeve so as to maintain the bearing in the desired assembled relation under varying atmospheric conditions, and it is a further object of this invention to produce a low-cost bearing assembly for use in same.

These and other objects and advantages of this invention will hereinafter appear, and for purposes of illustration but not of limitation an embodiment of the invention is shown in the accompanying drawing in which—

Figure 1:
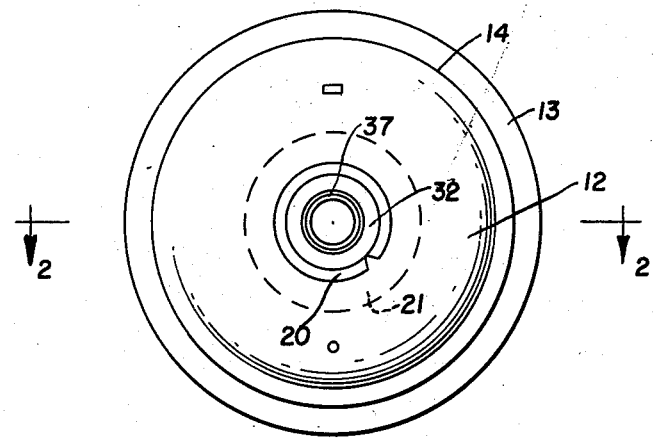
Figure 2:
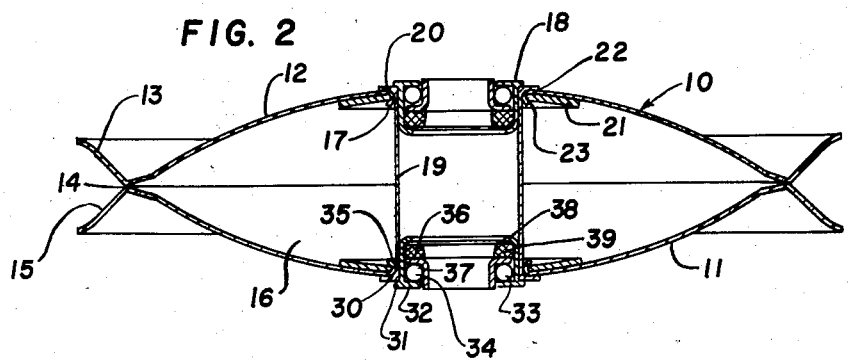

Figure 1 is a side elevational view of a wheel assembly embodying features of this invention, and Fig. 2 is a sectional view taken along the line 2—2 of Fig. 1.

Referring now to the drawing, the wheel structure used to illustrate the practice of the invention comprises a pair of metal disc plates 10 and 11 formed with a curvilinear central concave portion 12 with a rim portion 13 extending outwardly curvilinear from the edge portion 14 thereof. In assembly, the pair of disc members 10 and 11 are positioned in face-to-face relation with the outer annular edges 14 substantially in contact with each other all around for attachment, as by spot welding or the like, with the rim member 13 extending outwardly curvilinearly in opposite directions to form an annular recess 15 therebetween for receiving the rubber tire in seating relation. The face concave portions 12 extending inwardly of the outer edges 14 provide a bulbous hollow portion 16 therebetween which gives the impression of dimension to the wheel and imparts strength and rigidity thereto.

Each of the disc members 10 and 11 is formed with an opening 17 in the central portion for receiving a bearing member 18 rotatably to mount the wheel on an axle or shaft extending crosswise of the vehicle or toy. In accordance with the practice of this invention, the bearing members 18 are adapted to be inserted in position of use in a sleeve member 19 formed of a strip of sheet metal turned about a diameter corresponding to the diameter of the opening 17 to form a split sleeve having a length corresponding to the outer wall-to-wall dimension of the joined disc members. An annular flange 20 is formed on the outer ends of the sleeve member to extend radially outwardly beyond the opening into abutting relation with the walls of the disc members adjacent the openings to fix the sleeve member in the assembled relation on the joined disc wheel members to provide bearing supports.

In order to prevent expansions and contractions of the sleeve member which differ in relation from the expansions and contractions taking place in the bearing member 18 and to enable use of the low-cost split sleeve section 19 formed of available low-cost material, as distinguished from seamless tubing, each disc member 10 and 11 is provided with a washer 21 formed of low-cost and readily available scrap or sheet material having a central opening 22 dimensioned to correspond to the diameter of the bearing plus the wall thickness of the split sleeve and the wheel disc member. The washer is secured inwardly of the disc plate adjacent the central opening 17 by turning the inner edge portion of the disc plate adjacent the opening inwardly through the opening 22 of the washer 21 and up about the opposite wall thereof to form an annular groove 23 in which the washer plate is relatively permanently received. When in this position, the washer plate 21 functions effectively to prevent variation in dimension of the split sleeve thereby to maintain the desired frictional engagement with the housing of the bearing 18 to prevent inadvertent displacement thereof from the assembled relation.

The improved bearing member, a duplicate of which is inserted into each side of the sleeve opening, comprises a bearing housing in the form of a cylindrical section 30 having a diameter corresponding to the inner wall-to-wall dimension of the split sleeve opening.

The cylindrical section is molded to provide an annular flange 31 extending outwardly at the forward edge to extend beyond the sleeve opening and to function as a stop upon engagement with the forward edge thereof upon insertion to the assembled relation. The cylindrical section is formed with an annular flange 32 which extends inwardly a short distance to provide a lower race for a plurality of ball bearings 33 loosely housed within an annular space 34 defined by the flange 32, the adjacent side-wall portion 35 of the cylindrical section, and the annular flange 36 extending inwardly from the inner end of a short sleeve section 37 dimensioned to have a diameter corresponding to the diameter of the axle or shaft upon which the wheel is mounted. The sleeve section 37 forms the inner wall of the ball bearing housing and is mentioned to have a length to extend outwardly through the opening between the in-turned annular flange 32 and substantially flush with the outer wall thereof.

In order to provide for sufficient engagement between the bearing housing and the sleeve section in which it is inserted to minimize the amount of play and to maintain the desired assembled relation, the length of the cylindrical section of the bearing is dimensioned to be greater than that required to form the annular recess for the roller bearings. The additional space is taken up with a filler disc 39 loosely mounted within the housing rearwardly of the annular flange 36 and then the inner end portion of the cylindrical section 30 is turned inwardly about the end of the filler disc 39, as at 38, to provide a unitary assembly capable of insertion into the open end of the sleeve as a unit with the inner sleeve 37 freely rotatable relative to the bearing housing to enable free rotational movement of the wheel about the shaft extending therethrough.

It will be understood that changes may be made in the detailed construction and shape of the wheeled disc members and the materials of which it is formed. It will be further understood that the assembled wheel disc members having the supporting washer plate 21 may be adapted for use with other types of bearings for mounting the wheel for free rotational movement on a shaft or supporting axle, and that the washer or ring utilized for purposes of preventing increase in the diameter of the split sleeve may be inserted about the split sleeve independently of the disc members, and that other changes may be made in the details of construction, arrangement, and operation without departing from the spirit of the invention, especially as defined in the following claim.

I claim:

In a wheel structure of the type described having a pair of facing disc members having outwardly bowed central portions with aligned bearing openings therein through which the shaft extends for rotatably mounting the wheel and a sleeve member extending crosswise through the openings between the disc members for receiving the bearing members in the ends thereof, a bearing member comprising a cylindrical housing having a diameter corresponding to the inner wall to wall dimension of the sleeve, an annular flange extending outwardly from the forward end portion of the cylindrical housing and an annular flange extending inwardly from the end portion of the cylindrical housing to a distance to form an opening slightly greater than the diameter of the shaft upon which the wheel is adapted to be rotatably mounted, a sleeve section located within the cylindrical section having an inner diameter corresponding to the diameter of the shaft and having a flange extending outwardly from the inner end portion of the sleeve into a closely spaced relation with the inner wall of the cylindrical housing, said sleeve section being dimensioned to have a length to define a race between the flanged sleeve and the flanged end portion of the housing, ball bearings located within the race for permitting free rotational movement between the sleeve section and the housing, the length of the housing being substantially greater than the length of the flanged sleeve for engaging the wheel sleeve through a greater length thereof, and a spacer dimensioned to take up the greater length of the housing and means for confining the spacer and flanged sleeve section within the housing.

References Cited in the file of this patent

UNITED STATES PATENTS

| | | |
|---|---|---|
| 1,537,391 | Wagner | May 12, 1925 |
| 1,570,257 | Kaufmann | Jan. 19, 1926 |